(12) United States Patent  (10) Patent No.: US 7,878,474 B1
Richer et al.  (45) Date of Patent: Feb. 1, 2011

(54) INSTRUMENT TILT STAND WITH PRE-LOAD AND DETENTS

(75) Inventors: Paul A. Richer, Everett, WA (US); Brian Aikins, Everett, WA (US)

(73) Assignee: Fluke Corporation, Everett, WA (US)

( * ) Notice: Subject to any disclaimer, the term of this patent is extended or adjusted under 35 U.S.C. 154(b) by 103 days.

(21) Appl. No.: 11/842,893

(22) Filed: Aug. 21, 2007

(51) Int. Cl.
*A47F 5/00* (2006.01)

(52) U.S. Cl. ..................................................... 248/351

(58) Field of Classification Search .............. 248/176.1, 248/136, 455, 457
See application file for complete search history.

(56) References Cited

U.S. PATENT DOCUMENTS 4,113,212 A * 9/1978 Coriden ....................... 248/455
7,001,088 B2 * 2/2006 Hui-hu ........................ 400/681

* cited by examiner

*Primary Examiner*—Terrell Mckinnon
*Assistant Examiner*—Erin Smith
(74) *Attorney, Agent, or Firm*—Christensen O'Connor Johnson Kindness PLLC

(57) ABSTRACT

A stand for propping up an instrument is provided, the stand having an open and a close position. The stand includes a body having a support end for resting on a surface and a coupling end for attaching to the instrument casing. The stand further includes at least one coupling arm at the coupling end, the coupling arm having contours about multiple axis. The contours undergo elastic deformation when the stand is coupled with the instrument casing, such that the elastic deformation causes the stand to match contours of the instrument casing when the stand is in the close position with respect to the instrument casing. The elastic deformation further supplies a force that assists the stand in movement of the stand between the open position and the close position. The contours also allow the stand to non-destructibly detach from the instrument casing during a hyper-extended open stand operation.

21 Claims, 7 Drawing Sheets

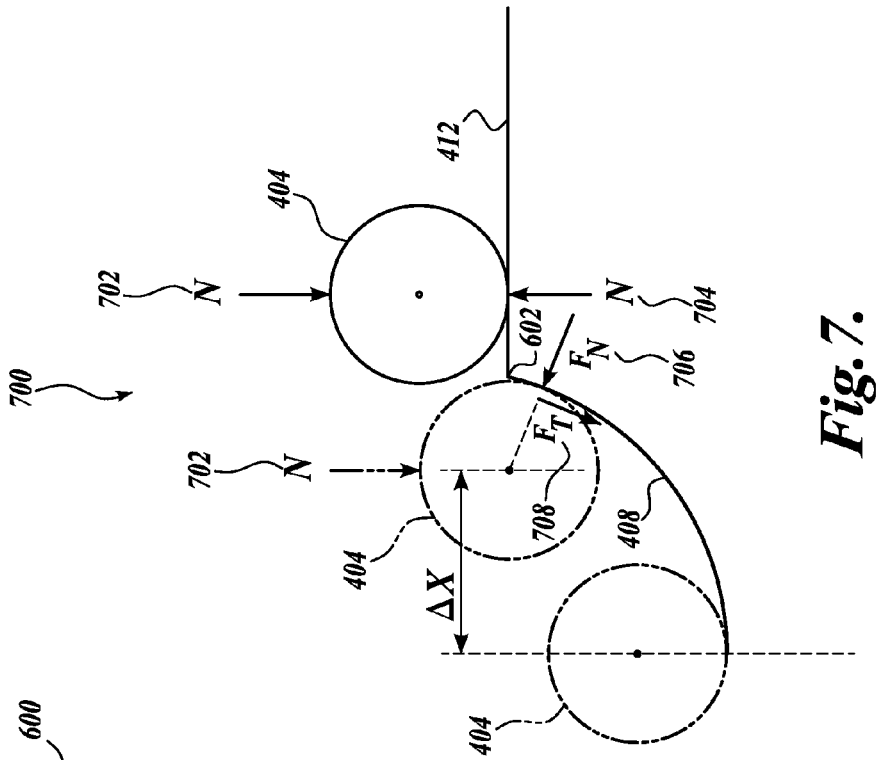
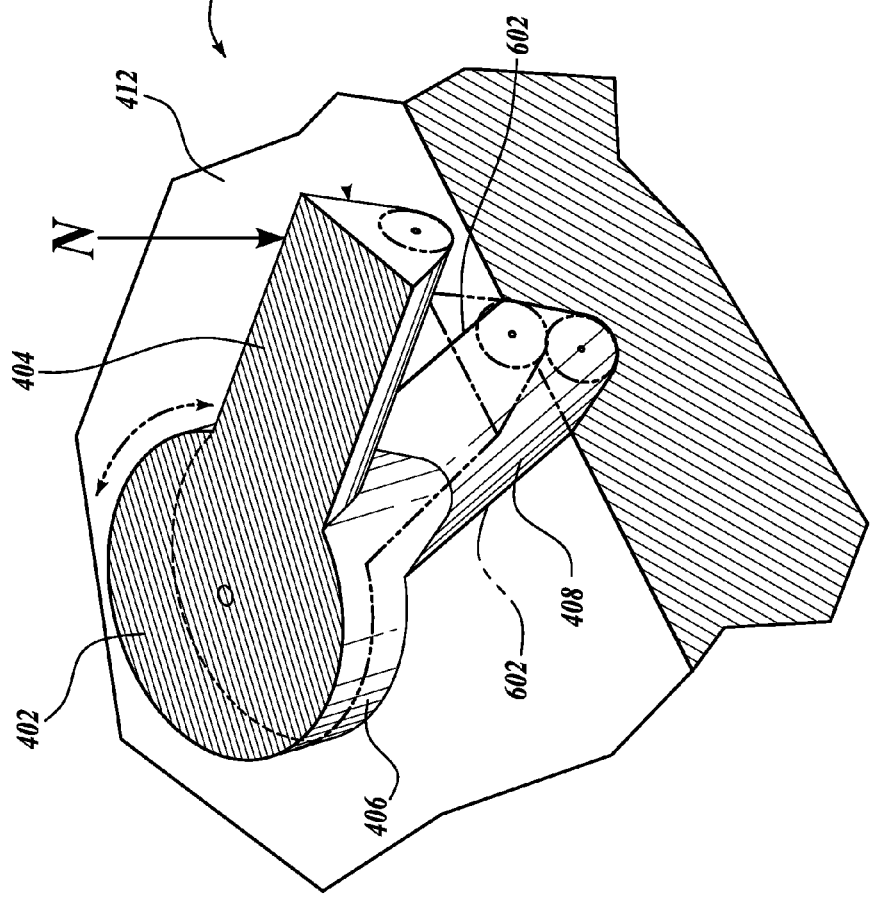
*Fig. 7.*
*Fig. 6.*

INSTRUMENT TILT STAND WITH PRE-LOAD AND DETENTS

BACKGROUND

Advancements in electronics, especially in digital electronics and communications, have resulted in wide availability and use of mobile instrumentation. Mobile instruments are used in a variety of industrial and business applications. For example, utility companies use data entry terminals to enter utility data, such as readings from gas and electrical meters at points of use. As another example, transportation and wholesale services use handheld terminals to enter data related to services they provide, such as delivery address and customer name and signature.

Another area where mobile instruments and devices are used is industrial and technical fields. Many technical mobile instruments are used in the field under conditions which necessitate setting the instrument down to free the hands of the user. For example, a field technician measuring some physical quantity, such as voltage, current, pressure, temperature, or humidity may need to set down the industrial measurement instrument to free his hands to probe a circuit or make some notes. Under such conditions, it is advantageous to be able to prop up the industrial measurement instrument on a surface, such as a table, a ledge, or on the ground with a convenient orientation that makes a screen, buttons, and other controls of the industrial measurement instrument accessible to the field technician. It is also advantageous to allow convenient adjustment of the position or orientation of the instrument using one hand without the tilt stand partially closing. Furthermore, a close fit of such tilt stand with the industrial measurement instrument is desirable to avoid inadvertently opening or snagging the tilt stand onto clothing or other objects. Additionally, a good fit between the tilt stand and the casing of the industrial measurement instrument enhances the quality and aesthetic aspects of the industrial measurement instrument. Under field conditions, an industrial measurement instrument propped up by a tilt stand in an open position may be struck or pushed down inadvertently, for example, by falling objects such as a case or a box, causing the open tilt stand to be hyper-extended and broken off from the casing of the industrial measurement instrument. As such, it is advantageous to have a tilt stand attached to the casing of the industrial measurement instrument such that if the tilt stand is hyper-extended, it detaches from the casing of the industrial measurement instrument without breaking or causing damage to the industrial measurement instrument or its casing.

SUMMARY

In accordance with one aspect of the invention a stand for propping up an instrument is provided, the stand having an open and a close position. In one illustrative embodiment, the stand includes a body having a support end for resting on a surface and a coupling end for attaching to the instrument casing. The stand further includes at least one coupling arm at the coupling end, the coupling arm having contours about multiple axes. The contours undergo elastic deformation when the stand is coupled with the instrument casing, such that the elastic deformation causes the stand to match contours of the instrument casing when the stand is in the close position with respect to the instrument casing.

In accordance with another aspect of the invention a stand for propping up an instrument is provided, the stand having an open and a close position. In one illustrative embodiment, the stand includes a body having a support end for resting on a surface and a coupling end for attaching to the instrument casing. The stand further includes at least one coupling arm at the coupling end, the coupling arm having contours about multiple axes. The contours cause an elastic deformation of the stand when the stand is coupled with the instrument casing. This elastic deformation supplies forces that assists the stand in movement of the stand between the open position in which the stand provides a support for the instrument casing and the close position in which the stand matches the contours of the instrument casing.

In accordance with yet another aspect of the invention a stand for propping up an instrument is provided, the stand having an open and a close position. In one illustrative embodiment, the stand includes a body having a support end for resting on a surface and a coupling end for attaching to the instrument casing. The stand further includes at least one coupling arm at the coupling end, the coupling arm having contours about multiple axis. A hinge member, included in the coupling arm, includes a coupling pin having a curved surface and a ridge extending away from the coupling pin. The coupling pin is used to rotatably attach the stand to the instrument casing, and the curved surface of the coupling pin and the contours allow the stand to non-destructibly detach from the instrument casing during a hyper-extended open stand operation.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a pictorial diagram of a cut-away section of the hinge formed by the hinge pin of FIG. 3 and the hinge pin receiver of FIG. 4;

FIG. 7 is a pictorial diagram of the forces acting on the hinge pin of FIG. 3 when attached to the hinge pin receiver of FIG. 4.

DETAILED DESCRIPTION

The presently claimed subject matter is described herein with reference to the accompanying illustrations where like numerals correspond to like elements. In one exemplary embodiment, a tilt stand with pre-attachment contours is attached to an industrial measurement instrument. The tilt stand is generally used to maintain an upright position of the industrial measurement instrument to free the hands of the user of the instrument while still providing an operational interface to the user, for example, to see information on a screen of the industrial measurement instrument, or to operate control keys and buttons of the same. The tilt stand may have at least one arm with pre-attachment contours including a hinge pin for attaching to a hinge pin receiving site on a casing of the industrial measurement instrument. The pre-attachment contours of the arms of the tilt stand are formed such that when the tilt stand is attached to the casing of the industrial measurement instrument, the tilt stand pre-attachment contours are caused to change to post-attachment contours by flexing of the tilt stand body and arms. The post-attachment contours cause the tilt stand to match the contours of the casing of the industrial measurement instrument. Additionally, the post-attachment contours of the arms and body of the tilt stand provide a restorative force between the hinge pin included in the arms of the tilt stand and the hinge pin receivers embedded in the casing of the industrial measurement instrument. Such restorative forces, which result from the attachment of the tilt stand to the casing of the industrial measurement instrument, allow a spring-loaded action to be created during a tilt stand open operation and a tilt stand close operation. The tilt stand open and close operations are more fully described below.

Figure 1:
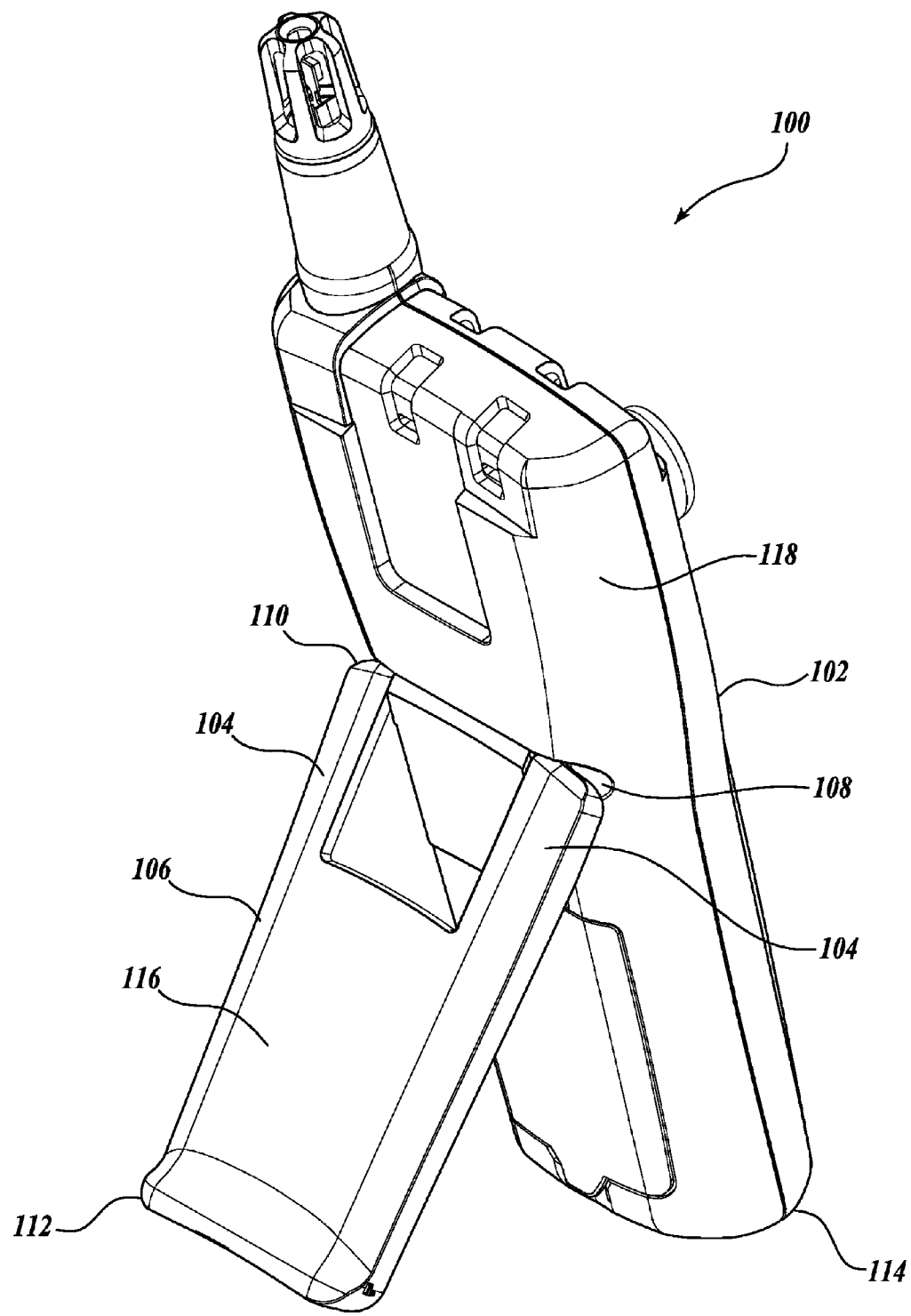
FIG. 1 is a pictorial diagram of an industrial measurement system having a tilt stand.

FIG. 1 is a pictorial diagram of an industrial measurement system 100 having a tilt stand 106. In one exemplary embodiment, the tilt stand 106 is an elongated member having a hinge end 110 and a support end 112. The hinge end 110 attaches to a hinge pin receiving area 108 in the back of a casing 118 of the industrial measurement instrument 102, on the opposite side from where the screen and control buttons of the industrial measurement instrument 102 are located. In one exemplary embodiment, the tilt stand 106 has two arms 104, forming a U-shaped member, and a body 116. In another exemplary embodiment, the tilt stand 106 comprises a T-shaped arm for attachment to the casing of the industrial measurement instrument 102. Those skilled in the art will appreciate that the tilt stand may have many other shapes without departing from the spirit of the present disclosures. The tilt stand 106, when in an open position, forms a triangular support in conjunction with a base 114 of the industrial measurement instrument 102. The triangular support maintains the industrial measurement instrument 102 in an upright position when placed on any flat surface, such as a ledge or the ground.

Figure 2:
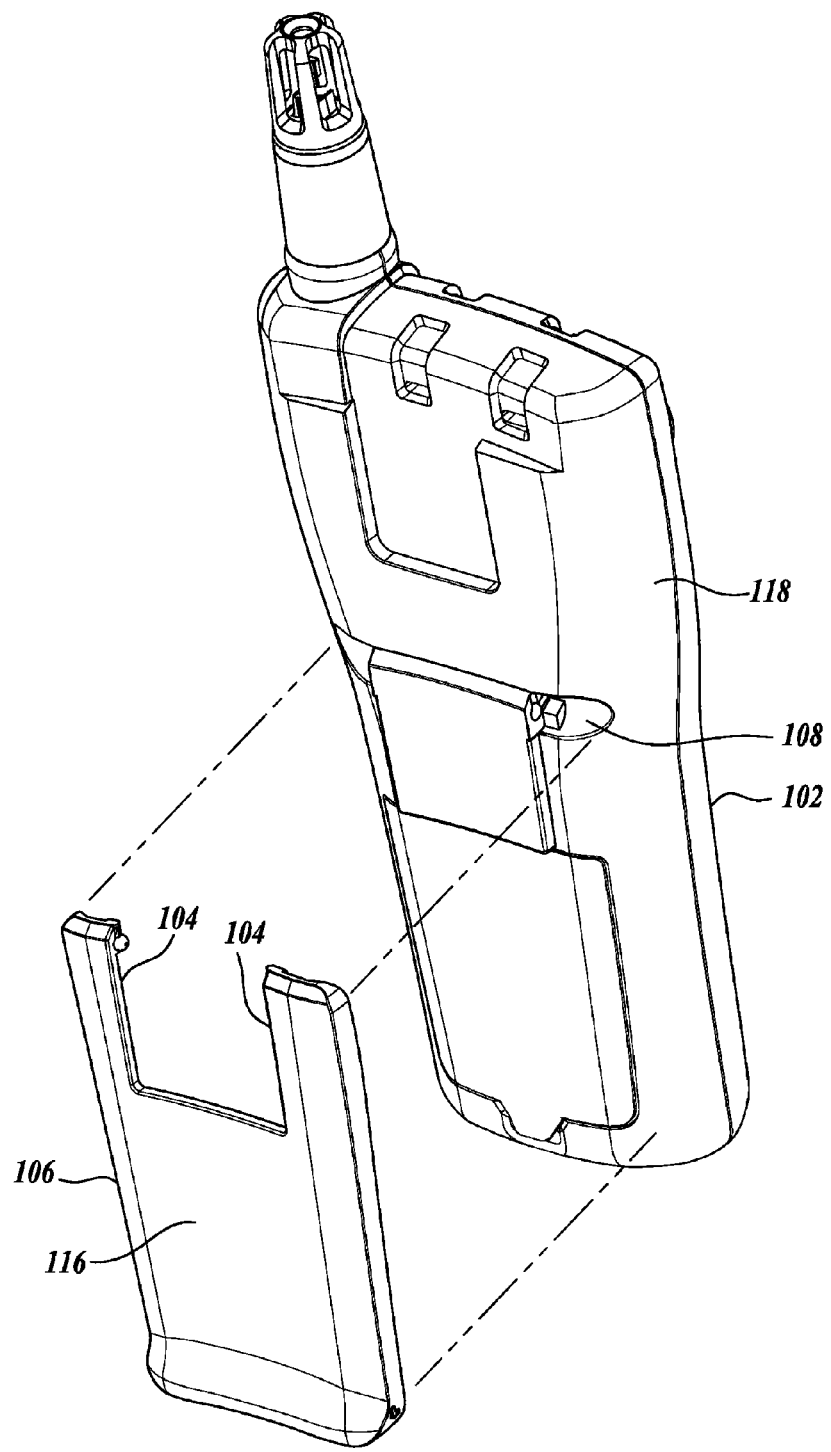
FIG. 2 is another view of the tilt stand showing the point of attachment with the industrial measurement system of FIG. 1.

FIG. 2 is a view of the tilt stand showing the points of attachment of the tilt stand with the industrial measurement system 100 shown in FIG. 1. In FIG. 2, each arm includes a hinge pin for attaching the tilt stand 106 to the casing of the industrial measurement instrument 102 at a hinge pin receiving area 108. The tilt stand 106 is attached to the hinge pin receiving area 108 at the hinge end 110, allowing the support end 112 of the tilt stand 106 to rotate about an axis extending through the hinge pin receiving area 108, that is, passing from side to side of the industrial measurement instrument 102 at the hinge pin receiving area 108. As noted above, the tilt stand 106 may have a body 116 and arms 104 with pre-attachment contours. The pre-attachment contours of the body 116 and arms 104 create pre-load stresses when forcibly flexed and attached to the casing of the industrial measurement instrument 102 at hinge pin receiving area 108. The pre-load stresses thus created in the arms 104 of the tilt stand 106 enable firm attachment of the tilt stand 106 to the casing of the industrial measurement instrument 102. Furthermore, the pre-load stresses allow spring-loaded assistance in the tilt stand open operation and the tilt stand close operation, as further described in detail below.

Figure 3:
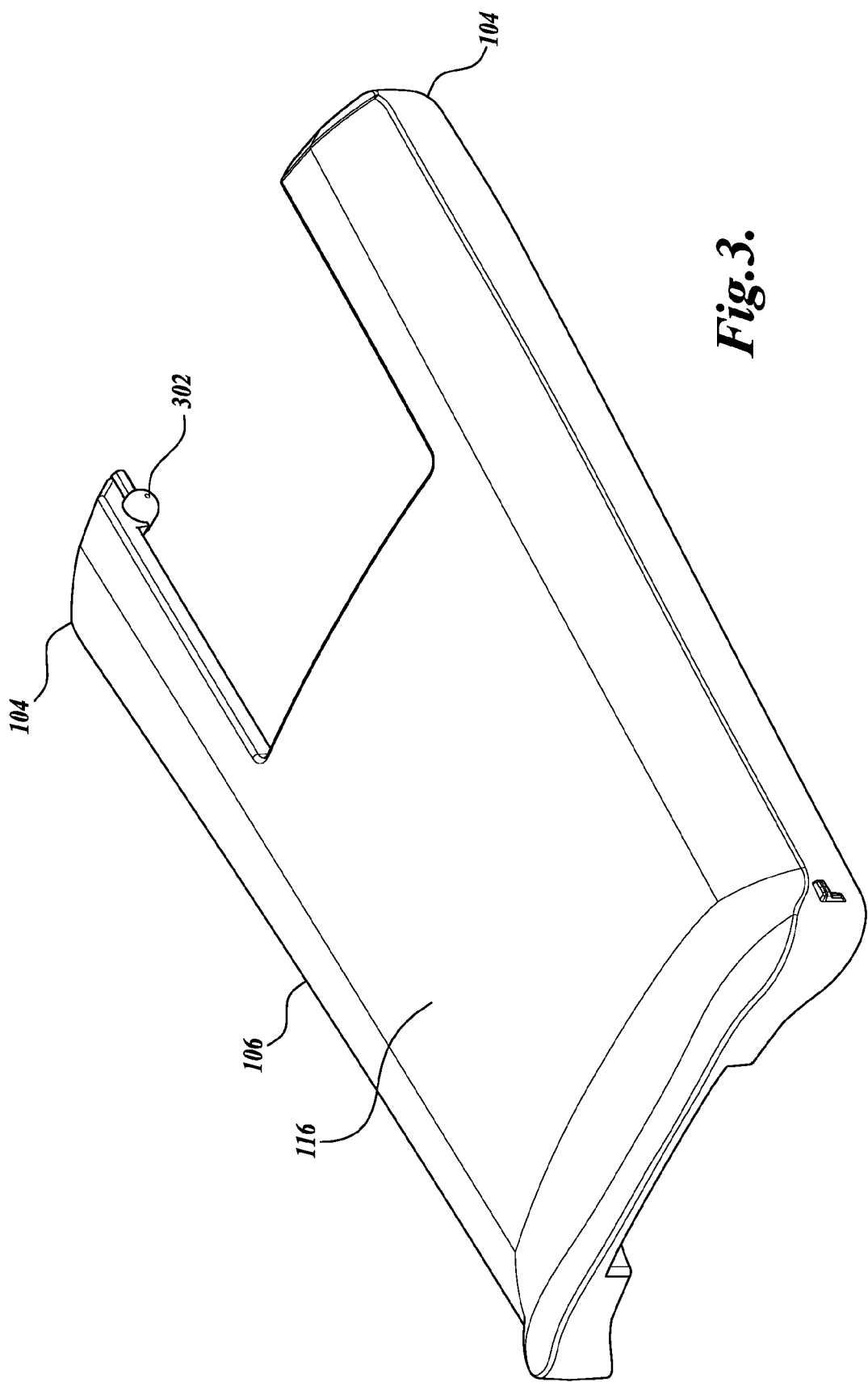
FIG. 3 is a pictorial diagram of an arm of the tilt stand of FIG. 2 including a hinge pin.

The tilt stand open operation and tilt stand close operation may be better understood with reference to the shape of the hinge pin included in the arms 104 of the tilt stand 106. FIG. 3 is a pictorial diagram of an arm of the tilt stand 106 including a hinge pin 302. Generally, the hinge pin 302 includes curved surfaces that form a cam for controlling forces acting on the arms 104 and the corresponding motion of the tilt stand 106. Those skilled in the art will appreciate that mechanical cams may be designed in many different ways for transferring forces and controlling the motion of a mechanical member in response to applied mechanical forces. Such mechanical forces may be created due to elastic deformation of mechanical members, such as the arms 104 of the tilt stand 106. As noted above, the arms 104 are formed with pre-attachment contours that when attached to the casing of the industrial measurement instrument 102 flex to create post-attachment contours in addition to pre-load stresses in the arms 104 of the tilt stand 106.

Figure 4:
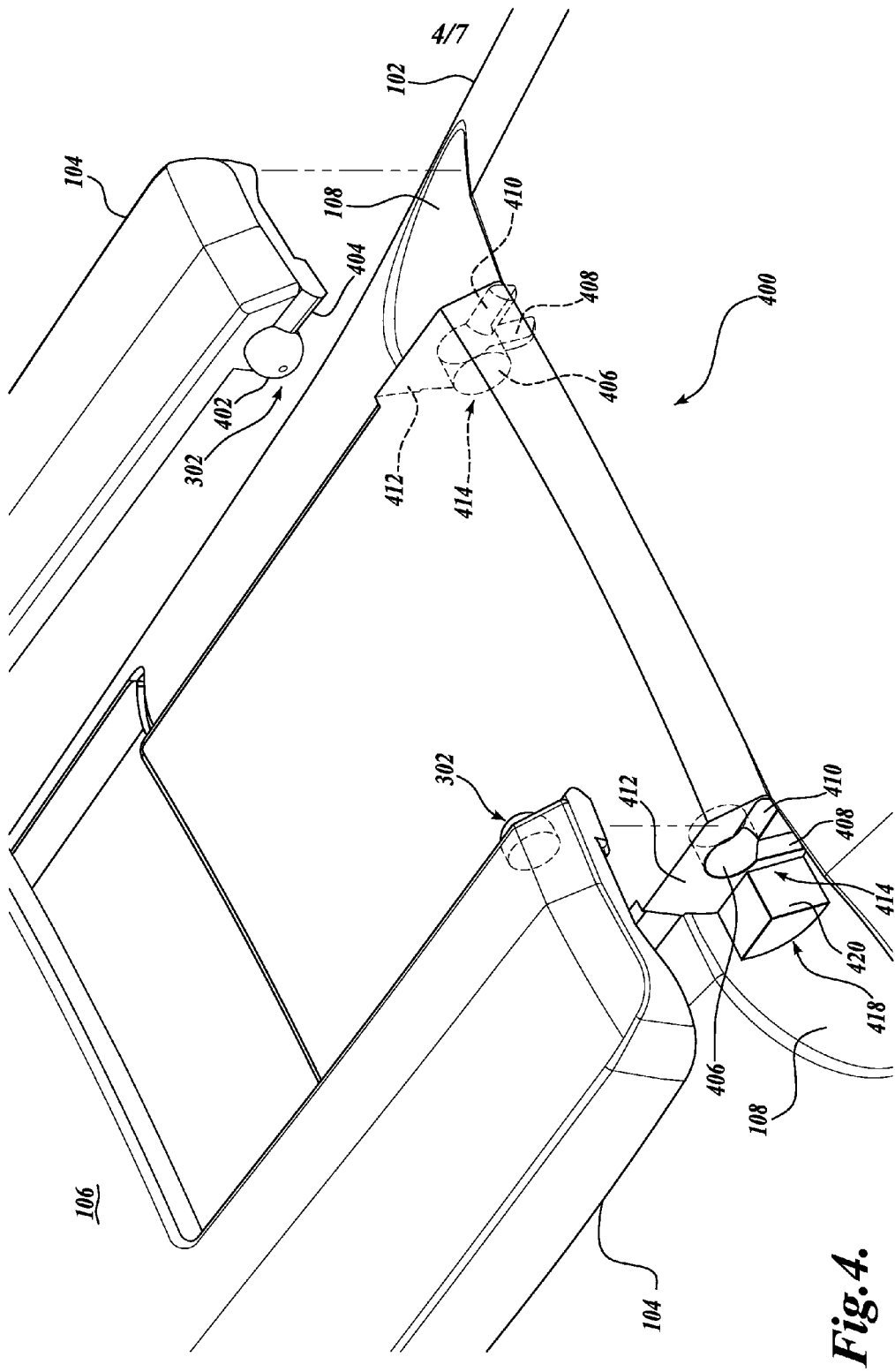
FIG. 4 is a pictorial diagram of a casing of the industrial measurement system of FIG. 1 showing a hinge pin receiver where the hinge pin of FIG. 3 is attached.

The cam action of the hinge pin 302 included in the arm 104 may result from contours on different surfaces of the hinge pin 302. FIG. 4 is a pictorial diagram of a casing of the industrial measurement system 100 of FIG. 1 showing a hinge pin receiver 414 where the hinge pin 302 is received. In one exemplary embodiment, the hinge pin 302 included in the arm 104 comprises a hemispherical tip 402 and a ridge in the form of an elongated semi-cylindrical detent 404 that extends radially away from the hemispherical pin tip 402. Those skilled in the art will appreciate that the hinge pin tip 402 and the hinge pin detent 404 may have other shapes without departing from the spirit of the present disclosures. The process of attachment of the tilt stand 106 to the casing of the industrial measurement instrument 102 includes pressure fitting of the tilt stand 106 to the casing. In the attachment process, the arms 104 of the tilt stand 106 are forced to engage the hinge pin receiving area 108 comprising a hinge pin tip receiver 406 and at least one hinge pin detent receiver 408 or 410. The hinge pin tip receiver 406 may comprise a hemispherical pit to match the shape of the hinge pin tip 402. Similarly, the hinge pin detent receivers 408 and 410 may comprise semi-cylindrical grooves matching the shape of the detent 404. Generally, the hinge pin tip receiver 406 and the hinge pin detent receivers 408 and 410 are formed to match the shape of the hinge pin tip 402 and hinge pin detent 404, respectively. For example, the hinge pin detent receivers 408 and 410 and the hinge pin detent 404 may have a dimple and bump shape instead of a groove and ridge shape, respectively. In yet another illustrative embodiment, the pin detent receivers 408 and 410 may be placed on the arms 104 instead of the casing 118, and the pin detents 404 may be placed on the casing 118 instead of the arms 104, trading places. In one exemplary embodiment, two hinge pin detent receivers 408 and 410 are provided corresponding to a tilt stand open position and a tilt stand close position, respectively. Those skilled in the art will appreciate that more hinge pin detent receivers may be used to provide several open positions for the tilt stand 106. When the arms 104 of the tilt stand 106 are forced to engage the hinge pin receiving area 108, the hinge pin tip 402 is received inside the hinge pin tip receiver 406 and the detent 404 is received within one of the detent receivers 408 and 410.

An open position stop 418 may be provided to prevent the tilt stand 106 from moving beyond the open position. The stop 418 prevents hyperextension of the tilt stand 106 to an extent that could damage the tilt stand 106 and/or the casing of the industrial measurement instrument 102. In one exemplary embodiment, the stop 418 is in close proximity of the hinge pin receiving area 108. In this embodiment, the hinge pin detent 404 comes into abutment with a stop surface 420 of the stop 418 to prevent hyperextension if the tilt stand 106 is pushed beyond the open position. The stop 418 may be implemented differently in other embodiments of the invention. For example, the open position stop may include a sliding band or rod connected between the support end 112 of the tilt stand 106 and the base 114 of the industrial measurement instrument 102. Those skilled in the art will appreciate that many other methods are available for preventing the hyperextension of a rotatably movable member, such as the tilt stand 106.

During the installation of the tilt stand 106, the pre-attachment contours of the body 116 and arms 104 are forced to flex and be transformed into the post-attachment contours, as noted above. The post-attachment contours of the body 116 and arms 104 of the tilt stand 106 cause the overall post-attachment contours of the tilt stand 106 to match the contours of the casing 118 of the industrial measurement instrument 102. Those skilled in the art will appreciate that, generally, the contours of a mobile industrial measurement instrument 102 are designed to be held in human hands, and thus the casing generally has a somewhat irregular shape. Hence, the pre-attachment contours of the body 116 and arms 104 of the tilt stand 106 are designed such that when they are transformed into the post-attachment contours, the tilt stand post-attachment contours match the irregular contours of casing 118 of the industrial measurement instrument 102 for better fit and function of the tilt stand 106. In one illustrative embodiment, once attached, the tilt stand 106 may assume one of at least two positions: open and close, as indicated above. The tilt stand 106 may also have one or more intermediate positions between the open and the close position to provide several viewing angles for the user of the industrial measurement instrument 102 when the tilt stand 106 is not in close position and is being used for propping up the industrial measurement instrument 102. The hinge pin detent receivers 408 and 410 act as stops for the open and close positions, respectively. To move from the open position to the close position, or vice versa, some manual force is required to force the hinge pin detent out of the hinge pin detent receiver 408 or 410. The manual force is applied to the tilt stand 106 to rotate the tilt stand about the hinge pin receiving area 108. If the tilt stand 106 is in the close position, the tilt stand 106 is in direct contact with the casing 118 of the industrial measurement instrument 102 and cannot move further in the direction of the casing 118. However, if the tilt stand 106 is in the open position, hyper-extending the tilt stand 106 by pushing the support end 112 of the tilt stand 106 further away from the base 114 will cause the hinge pin detent 404 to press against the stop surface 420. The continued pressure between the hinge pin detent 404 and the stop surface 420 causes the hinge pin tip 402 to rise out of the hinge pin tip receiver 414, flex, and spread apart the arms 404, thereby nondestructively detaching the tilt stand 106 from the casing of the industrial measurement instrument 104. The detachment of the tilt stand 106 from the instrument allows the arms 104 to return to the pre-attachment contours. The tilt stand 106 may subsequently be reattached to the casing of the industrial measurement instrument 102, as discussed before.

Figure 5:
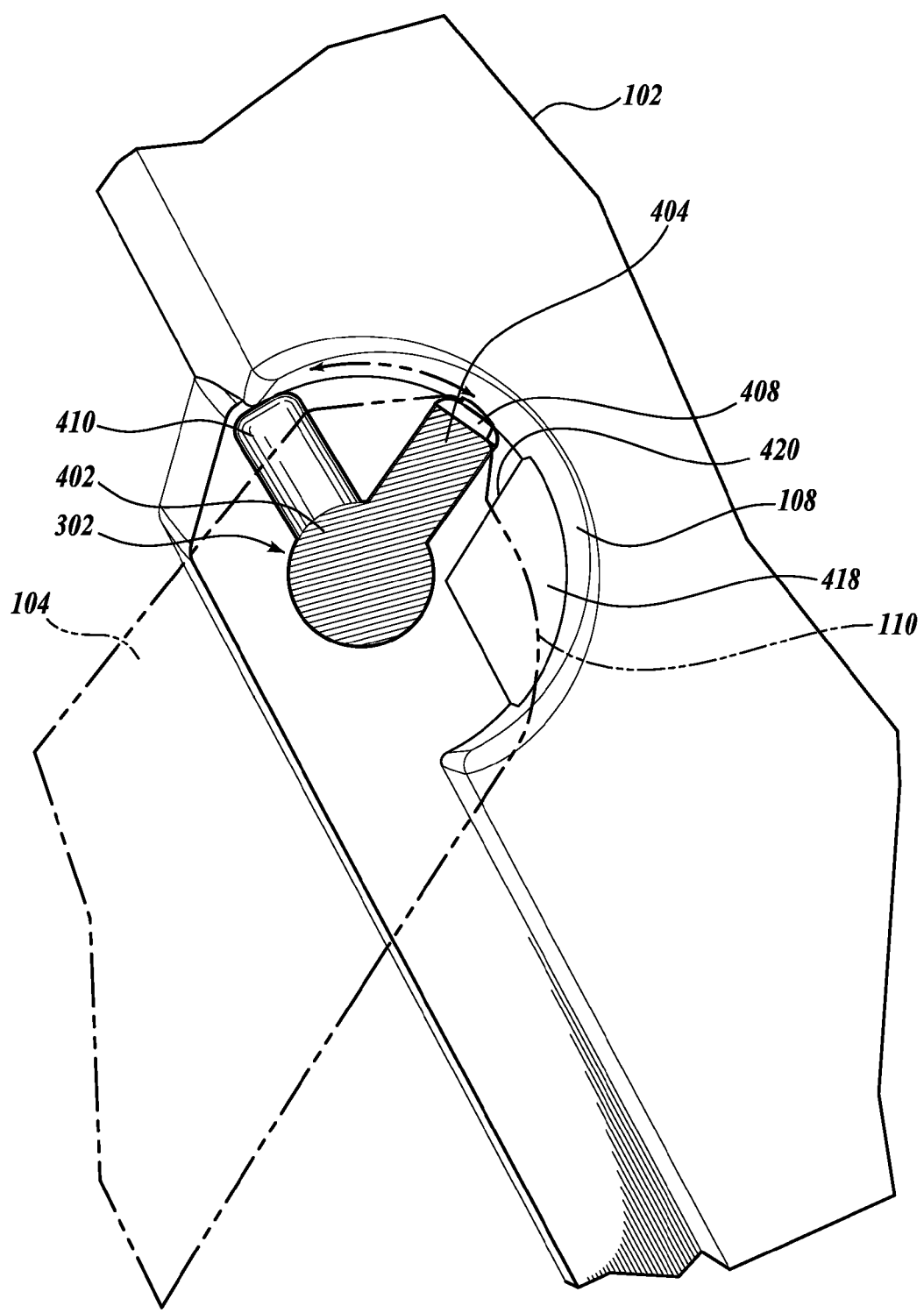
FIG. 5 is a pictorial diagram of the detail of the area of the casing of FIG. 4 showing the relationship between the hinge pin shown in FIG. 3 and the hinge pin receiver shown in FIG. 4.

FIG. 5 is a pictorial diagram of the detail of the area of the casing showing the hinge pin 302 retained by the hinge pin receiving area 108 to form a hinge for the tilt stand 106. FIG. 5 shows the hinge end 110 of the tilt stand 106 in close-up details. In this post-attachment pictorial diagram, the hinge pin tip 402 is fully engaged with the hinge pin tip receiver 406 and the hinge pin detent 404 is fully engaged with the hinge pin detent receiver 408 to securely hold the tilt stand 106 in the open position. During a tilt stand close operation, the tilt stand arm 104 is rotated in a direction (counter-clockwise in FIG. 5) so as to bring the support end 112 of the tilt stand 106 in contact with the casing of the industrial measurement instrument 102. During a close operation, the hinge pin detent 404 disengages from the hinge pin detent receiver 408 and is rotated towards the hinge pin detent receiver 410. The tilt stand close operation is complete when the hinge pin detent 404 fully engages and is positioned within the hinge pin detent receiver 410.

As noted above, spring forces are asserted on the tilt stand 106 during the tilt stand open operation and the tilt stand close operation. Also as noted above, the spring forces are caused by the pre-load stresses in the arms 104 of the tilt stand 106 and are the result of attaching the tilt stand 106 to the casing 118 of the industrial measurement instrument 102. The spring assistance of the tilt stand open operation and the tilt stand close operation results from the cam action of the curved surfaces of the hinge pin 302, as more fully described below.

FIG. 6 is a pictorial diagram of a cut-away section 600 of the hinge formed from the hinge pin 302 and the hinge pin receiver 414. The spring assistance for the tilt stand open and tilt stand close operations starts when the hinge pin detent 404 reaches an edge of the hinge pin detent receiver 408 or 410 during a transition from a tilt stand open position to a tilt stand close position or vice versa. When the tilt stand 106 is between a tilt stand close position and a tilt stand open position, the hinge pin detent 404 is on a surface area 412 between the hinge pin detent receiver 408 and the hinge pin detent receiver 410. When the tilt stand is moved manually towards the open position or close position, the hinge pin detent 404 approaches the hinge pin detent receiver 408 or 410, respectively. When the hinge pin detent 404 reaches an edge 602 of the hinge pin detent receiver 408, a cam action resulting from the curvature on the surface of the hinge pin detent 404 is initiated.

FIG. 7 is a pictorial diagram of the forces acting on the hinge pin 302 when attached to the hinge pin receiver 414. As noted above, the pre-load stresses in the arms 104 force the hinge pin 302 into the hinge pin receiver 414. The pre-load stresses in the arms 104 create a normal force 702 between the hinge pin detent 404 and the surface 412 of the hinge pin receiving area 108. Before the hinge pin detent 702 reaches the edge 602 of the hinge pin detent receiver 408, the normal force 702 is equally countered with the reactive force 704. At the moment the hinge pin detent 404 reaches the edge 602 of the hinge pin detent receiver 408, the normal force 702 imposed by the arms 104, as a result of the post-attachment contours and the corresponding pre-load stresses of the arms 104, is divided into two force components. One force component is the normal force 706 acting radially on the hinge pin detent 404 to push it further inwards to the center of the curvature of the hinge pin receiver 408 and the tangential force 708 pushing the hinge pin detent 404 further downwards inside the hinge pin detent receiver 408. The spring assisted action of the cam formed by the curved surfaces of the hinge pin detent 404 and the hinge pin detent receiver 408 can thus cause the tilt stand 106 to automatically and without further manual intervention, accelerate and move into an open position or a close position once manually pushed to the edge 602 of the hinge pin detent receiver 408 or 410, respectively.

Figure 8:
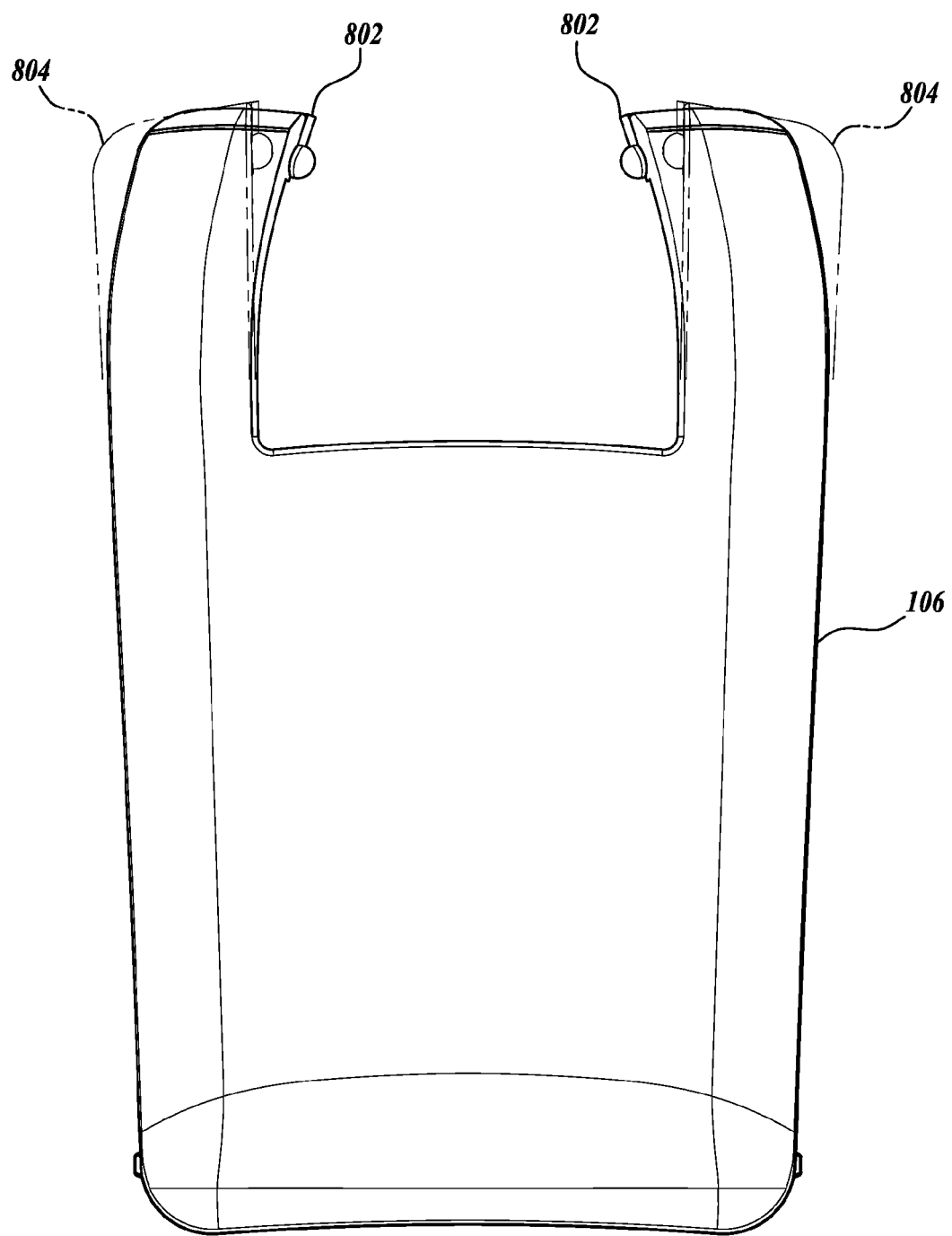
FIG. 8 depicts the tilt stand of FIG. 2 illustrating the arms of the tilt stand without pre-attachment contours superimposed on arms of the tilt stand with pre-attachment contours.

As noted above, the pre-load stresses created in the body 116 and arms 104 of the tilt stand 106 result from the transformation of pre-attachment contours to the post-attachment contours of the body 116 and arms 104. The body 116 and arms 104 are formed with pre-attachment contours that are transformed to post-attachment contours when the tilt stand 106 is attached to the casing 118 of the industrial measurement instrument 102. FIG. 8 is a pictorial diagram of the tilt stand 106 with arms 804 having no pre-attachment contours superimposed on arms 802 with pre-attachment contours. When pre-attachment contours of the arms 802 are forceably transformed to post-attachment contours, two types of changes take place in the arms 802. One change is a change in the contours of the arms 802 and the body 116 of the tilt stand 106. The other change includes the creation of preload stresses within the material constituting the arms 802 and the body 116 of the tilt stand 106. The change in the contours of the tilt stand 106 allow the tilt stand 106 to fit the contours of the casing of the industrial measurement instrument 102. The pre-load stresses in the arms 104 and body 116 of the tilt stand 106 provide the spring forces that maintains attachment of the tilt stand 106 to the casing of the industrial measurement instrument 102 and in addition provides the above-discussed spring assistance during the tilt stand open and close operations. The pre-attachment contours in the arms 802 may be around multiple axes simultaneously. In one illustrative embodiment, the arm 802 is twisted around an axis that extends from the hinge end 110 to the support end 112 of the tilt stand 106. In that same embodiment, the pre-attachment contours of the arms 802 exhibit curvature relative to an axis parallel to a line that extends between the hinge pins of the arms 802. The pre-attachment contours may include other curvatures around other arbitrary axes within the body of the tilt stand 106. In one illustrative embodiment, the arms 802 may be forced inwards towards each other to attach to the casing 108. In another illustrative embodiment, the arms 802 may be forced outwards away from each other to attach to the casing 118. Such curvatures are generally calculated using conventional engineering and mathematical techniques. For example, the pre-attachment contours may be calculated using finite element analysis methods. The pre-attachment contours in the arms 802 and body of the tilt stand 106 are computed using the finite element analysis methods such that when the tilt stand 106 is attached to the casing of the industrial measurement instrument 102 the resulting post-attachment contours provide a close physical fit between the post-attachment contours of the tilt stand 106 and the contours of the casing of the industrial measurement instrument 102. The pre-attachment contours may also be determined empirically to yield desired results. For example, a number of prototypes of the tilt stand 106 may be constructed and tested to find the one with the best fit with the casing of the industrial measurement instrument 102. Additionally, the pre-attachment contours of the tilt stand 106 are designed to provide appropriate pre-load stresses and restorative forces to accommodate the spring assisted tilt stand open and close operations.

While illustrative embodiments have been illustrated and described, it will be appreciated that various changes can be made therein without departing from the spirit and scope of the invention.

The embodiments of the invention in which an exclusive property or privilege is claimed are defined as follows:

1. A stand for an instrument casing, the instrument casing including at least one arm receiving portion having a hinge receiver and first and second grooves; the stand being positionable in an open position and a close position, the stand comprising:
   a body having a support end and a coupling end; and
   at least one coupling arm extending from the coupling end of the body, the coupling arm including a hinge pin and a curved surface, the hinge pin configured to be positioned in the hinge receiver of the instrument casing and the curved surface configured to be positioned in the first and second grooves, wherein during a close operation the curved surface and the first groove of the instrument casing causes a spring action to assist in positioning the stand in the close position and during an open operation the curved surface and the second groove of the instrument casing causes a spring action to assist in positioning the stand in the open position.

2. The stand of claim 1, wherein the body is further positionable in at least one intermediate position between the open and the close positions.

3. The stand of claim 1, wherein the body comprises two coupling arms arranged in a U-shaped configuration with respect to the body of the stand.

4. The stand of claim 1, wherein the body comprises two coupling arms arranged in a T-shaped configuration with respect to the body of the stand.

5. The stand of claim 1, wherein the coupling arm has more than two pre-attachment contours, each of the pre-attachment contours being around a different axis.

6. The stand of claim 1, wherein the curved surface extends from the hinge pin.

7. The stand of claim 1, wherein elastic deformation supplies a force that assists the stand in movement of the body between the open position and the close position.

8. A stand for an instrument casing having contours, the instrument casing including at least one arm receiving portion having a hinge receiver and first and second grooves, the stand comprising:
   a body having a support end and an coupling end; and
   at least one coupling arm extending from the coupling end of the body, the coupling arm including a hinge pin and a detent, wherein the at least one coupling arm includes a pre-attachment contour that causes an elastic deformation of the stand when the stand is coupled with the instrument casing, wherein the elastic deformation assists in providing a spring force during a close operation or an open operation, wherein the elastic deformation assists in causing the detent to move into the first groove during a close operation and assists in causing the detent to move into the second groove during an open operation.

9. The stand of claim 8, wherein the body is further positionable in at least one intermediate position between the open and the close positions.

10. The stand of claim 8, wherein the body comprises two coupling arms arranged in a U-shaped configuration with respect to the body of the stand.

11. The stand of claim 8, wherein the body comprises two coupling arms arranged in a T-shaped configuration with respect to the body of the stand.

12. The stand of claim 8, wherein the coupling arm has more than two pre-attachment contours, each of the pre-attachment contours being around a different axis.

13. The stand of claim 8, wherein the detent extends from the coupling pin.

14. The stand of claim 8, wherein the elastic deformation causes the stand to match contours of the instrument casing when the stand is in the close position with respect to the instrument casing.

15. A stand for an instrument casing, the instrument casing including at least one arm receiving portion having a coupling pin receiver and first and second grooves, the stand comprising:

a body having a support end and a coupling end, the body configured for movement between a close position and an open position relative to the instrument casing;

at least one coupling arm extending from the coupling end, the at least one coupling arm hingeably coupled to the instrument casing by a hinge member, the hinge member including a coupling pin and a ridge extending away from the coupling pin, wherein the coupling pin is configured to rotate within the coupling pin receiver of the instrument casing, and wherein a combination of the ridge of the hinge member and the first groove of the receiving portion of the instrument casing causes a spring action to assist in moving the body from the open position to the close position and a combination of the ridge of the hinge member and the second groove of the receiving portion of the instrument casing causes a spring action to assist in moving the body from the close position to the open position.

16. The stand of claim 15, wherein the body is further positionable in at least one intermediate position between the open and the close positions.

17. The stand of claim 15, wherein the body comprises two coupling arms arranged in a U-shaped configuration with respect to the body of the stand.

18. The stand of claim 15, wherein the body comprises two coupling arms arranged in a T-shaped configuration with respect to the body of the stand.

19. The stand of claim 15, wherein the coupling arm has more than two contours, each of the contours being around a different axis.

20. The stand of claim 15, wherein the first and the second contours cause an elastic deformation of the stand when the stand is coupled with the instrument casing, the elastic deformation supplying a force that assists the stand in movement of the stand between the open position and the close position.

21. The stand of claim 15, wherein elastic deformation of the body causes the stand to match the contours of the instrument casing when the stand is in the close position with respect to the instrument casing.

\* \* \* \* \*